US006775943B2

(12) United States Patent
Loughman (10) Patent No.: US 6,775,943 B2
(45) Date of Patent: Aug. 17, 2004

(54) MANUALLY MOVABLE DECOY DEVICE (76) Inventor: Van J. Loughman, 1252 Brown Creek Rd., R.D. 1, Box 138, Sycamore, PA (US) 15364

( * ) Notice: Subject to any disclaimer, the term of this patent is extended or adjusted under 35 U.S.C. 154(b) by 0 days.

(21) Appl. No.: 10/298,782

(22) Filed: Nov. 18, 2002

(65) Prior Publication Data
US 2003/0106253 A1 Jun. 12, 2003

Related U.S. Application Data (63) Continuation-in-part of application No. 09/915,078, filed on Jul. 24, 2001, now Pat. No. 6,487,810.

(51) Int. Cl.$^7$ .............................................. A01M 31/06
(52) U.S. Cl. ................................................... 43/2; 43/3
(58) Field of Search ......................... 43/2, 3; 446/201, 446/218, 236, 246, 247

(56) References Cited

U.S. PATENT DOCUMENTS

| 1,831,286 | A | * | 11/1931 | Chelini | 43/3 |
| 2,663,108 | A | | 12/1953 | Dixon et al. | |
| 2,691,233 | A | | 10/1954 | Richardson | |
| 2,787,074 | A | * | 4/1957 | Miller | 43/3 |
| 2,793,456 | A | * | 5/1957 | Argo | 43/3 |
| 3,768,192 | A | * | 10/1973 | Caccamo | 43/3 |
| 4,590,699 | A | * | 5/1986 | Nicks | 43/2 |
| 4,896,448 | A | | 1/1990 | Jackson | |
| 4,965,953 | A | * | 10/1990 | McKinney | 43/2 |
| 5,036,614 | A | * | 8/1991 | Jackson | 43/3 |
| 5,168,649 | A | * | 12/1992 | Wright | 43/2 |
| 5,199,204 | A | | 4/1993 | Lowery | |
| 5,274,942 | A | * | 1/1994 | Lanius | 43/2 |
| 5,289,654 | A | | 3/1994 | Denny et al. | |
| 5,392,554 | A | * | 2/1995 | Farstad et al. | 43/3 |
| 5,459,958 | A | * | 10/1995 | Reinke | 43/2 |
| 5,515,637 | A | * | 5/1996 | Johnson | 43/2 |
| 5,632,110 | A | * | 5/1997 | Roy | 43/2 |
| D398,697 | S | | 9/1998 | Scordo | |
| 5,884,427 | A | | 3/1999 | Lenz | |
| 5,974,720 | A | | 11/1999 | Bowling | |
| 6,021,594 | A | * | 2/2000 | Krueger | 43/2 |
| 6,070,356 | A | * | 6/2000 | Brint et al. | 43/2 |
| 6,082,036 | A | * | 7/2000 | Cripe | 43/3 |
| 6,092,322 | A | * | 7/2000 | Samaras | 43/2 |
| 6,212,816 | B1 | | 4/2001 | Babbitt et al. | |
| 6,216,382 | B1 | * | 4/2001 | Lindaman | 43/2 |
| 6,360,474 | B1 | * | 3/2002 | Wurlitzer | 43/3 |
| 6,470,620 | B1 | * | 10/2002 | Acker | 43/3 |
| 6,481,147 | B2 | * | 11/2002 | Lindaman | 43/2 |
| 6,574,902 | B1 | * | 6/2003 | Conger | 43/2 |
| 2002/0162268 | A1 | * | 11/2002 | Fulcher | 43/3 |
| 2002/0178639 | A1 | * | 12/2002 | Daniels | 43/3 |
| 2003/0079397 | A1 | * | 5/2003 | Brint | 43/2 |

FOREIGN PATENT DOCUMENTS

| GB | 2230171 | * 10/1990 |
| SE | 129808 | * 10/1950 |

OTHER PUBLICATIONS

English translation of SE Patent No. 129808, Oct. 17, 1950.*

* cited by examiner

Primary Examiner—Peter M. Poon
Assistant Examiner—David Parsley
(74) Attorney, Agent, or Firm—Webb Ziesenheim Logsdon Orkin & Hanson, P.C.

(57) ABSTRACT

A manually movable decoy device adapted for luring animals comprising a tail attachment member, a tail shaft with a pulling arm, a ground shaft, and a decoy attached to the tail attachment member selected from the group consisting of a tail-feather, an animal tail, and a first decoy body. The ground shaft, incorporating a spring mechanism, rotatably supports the tail shaft. A pull line is attached to the pulling arm. After inserting the decoy device into the ground, routing the pull line using guide shafts, and optionally inserting a second decoy body into the ground, the pull line may be pulled to produce a side-to-side motion of the decoy device.

6 Claims, 7 Drawing Sheets

MANUALLY MOVABLE DECOY DEVICE

CROSS REFERENCE TO RELATED APPLICATIONS

This application is a continuation-in-part application of U.S. patent application Ser. No. 09/915,078, filed Jul. 24, 2001, now U.S. Pat. No. 6,487,810 and entitled Method and Apparatus for Manually Activated Turkey Decoy, the contents of which are hereby incorporated herein by reference.

BACKGROUND OF THE INVENTION

1. Field of the Invention

The present invention relates to hunting decoys, and more specifically, to tail decoys and movable animal decoys.

2. Description of the Prior Art

Decoys of great variety in construction and purpose have been used to lure turkeys into range for effective hunting, harvest, and/or observation and study. While decoys often provide a life-like appearance, it has also been desirable for obvious reasons to make the decoy move in a life-like fashion in a manner that is exhibited by the represented animal. Faced with this challenge, practitioners in the art have endeavored on many occasions to so motivate a decoy. Previous attempts to create a realistic and effective decoy include:

Samara, U.S. Pat. No. 6,092,322, discloses the use of a wind activated animal decoy. Specifically, the use of a turkey decoy with tail-feathers, which upon wind activation, causes the head to move up and down and side-to-side.

Brint, U.S. Pat. No. 6,070,356, discloses the use of a full body turkey decoy, having a tail, which uses a battery-powered electric motor and internal counter weights to simulate strutting turkey behavior. Furthermore, the invention shows a turkey decoy that, upon activation, causes the decoy to rotate intermittently on a support rod and also causes tail vibration.

Lenz, U.S. Pat. No. 5,884,427, discloses a battery-operated animal decoy mechanism having a motor. The motor has at least one projecting member which activates a tail flicking attachment, thus simulating the tail flicking of a live animal.

It is well-known among turkey hunters that during the turkey mating season, male (gobbler) turkeys attempt to find female (hen) turkeys with which to breed. This results in gobblers initiating a mating ritual involving the display of their tail-feathers, while moving them from side-to-side in what is known as a full strut. The gobbler's full strut is meant to attract the hen to the gobbler for potential mating. Similarly, other animals, such as deer, elk, and squirrels, also use their tails to attract their respective mates.

Prior art decoys suffer from various drawbacks, in that imperfect conditions and inherent limitations in the design and surrounding environment generally cause these decoys to exhibit a typical or unrealistic movement which may startle or warn the animal or may have no effect whatsoever. Prior art decoys designed to move with nature's forces (as disclosed in the '322 patent, for example) lack controllable manual-motion. Similarly, the motion exhibited by electronically operated decoys (as disclosed in the '356 patent, for example) is generally not representative of mating rituals. Also, motor-driven decoys have an amount of noise inherent in their operation that results in animals being scared away from the decoy and the immediate area. Additionally, unfavorable weather (e.g., rain, dampness, coldness, etc.) may adversely affect electronic components through corrosion and condensation. Furthermore, electronic mechanisms tend to wear down the power source (usually batteries) required for the decoy's movement, relatively quickly. This may result in the decoy failing to operate at critical times during the hunting period. Moreover, some states and hunting associations do not permit the use of electronically controlled decoys. Finally, prior art decoys fail to provide a means of portability, thereby, not allowing a user to change the decoy from a use-mode to a portability-mode in an efficient manner.

Due to these drawbacks and limitations, the aforementioned prior art is generally non-conducive to hunting wild animals.

Accordingly, what is needed, and has not heretofore been developed, is a manually activated, realistic decoy apparatus that simulates the natural movements inherent to the rituals of various animals. Field work using the present invention has confirmed that decoy movement is critical to the believability of the decoy's authenticity in the minds of the animals that may observe it. Furthermore, within a dominant animal's territory, if another animal attempts to lure the dominant animal's females, the dominant animal becomes upset and approaches the challenging animal to re-establish dominance among the females. Therefore, decoy movements may be used to not only attract females, but also males.

Therefore, it is a principal object of the present invention to provide a decoy apparatus that through controllable manual motion produces a natural, isolated movement.

It is another object of the present invention to provide a decoy apparatus which is portable, lightweight, requires only a minimal number of elements, and requires only a minimal number of steps to utilize. This results in efficiency in set-up and preparation of the decoy, a critical aspect in hunting. Unlike the prior art, lighter components may also be utilized, such as arrow shafts, thereby resulting in a lighter and easier to carry decoy apparatus. Furthermore, the use of guide shafts allow the decoy apparatus to be used over and around varied terrain and obstacles, while also preventing the animals from tripping over the pull line utilized in the present invention.

It is an additional object of the present invention to provide such a decoy apparatus which utilizes real tails, as adding detail to the decoy, in order to draw animals to an even closer proximity, as compared to the use of artificial tails.

It is a further object of the present invention to allow the user to maintain a suitable distance from the decoy apparatus, while still achieving full operability over the invention.

It is another object of the present invention to provide a decoy apparatus which may be adapted to move not only the tail, but an entire decoy body.

It is a further object of the present invention to provide a lightweight decoy apparatus, which is simple and inexpensive in its design and construction.

SUMMARY OF THE INVENTION

The present invention provides, in the preferred embodiment, a manually movable decoy device adapted for luring animals comprising a tail attachment member, a tail shaft, a ground shaft, and a decoy attached to the tail attachment member. The decoy may be comprised of a tail-feather, an animal tail, or a first decoy body. The ground shaft, connected to the tail shaft by a spring mechanism, rotatably supports the tail shaft. A pull line is attached to the pulling arm of the tail shaft. After insertion of the decoy device's ground shaft into the ground, a second decoy body may be optionally inserted into the ground, forward and adjacent to the decoy device. Optional guide shafts may be inserted into the ground to route the pull line. The pull line may then be manually pulled to rotate the tail shaft assembly with respect to the ground shaft in a reciprocating manner, thereby causing controllable movement of the decoy. A plurality of brackets affixed to the tail attachment member, are adapted to retain the tail shaft, the ground shaft, and the guide shaft in a carry-mode configuration. Additionally, a carry cord is removably connected to the tail attachment member to allow a user to easily transport the entire decoy device. The foregoing and other features of the method and apparatus of the present invention will be further apparent from the description which follows.

BRIEF DESCRIPTION OF THE DRAWINGS

The descriptions and drawings disclosed in U.S. patent application Ser. No. 09/915,078 are hereby incorporated herein by reference. Other important objects and features of the invention will be apparent from the following detailed description of the invention, taken in connection with the accompanying drawings in which.

DETAILED DESCRIPTION OF THE PREFERRED EMBODIMENTS

Figure 1:
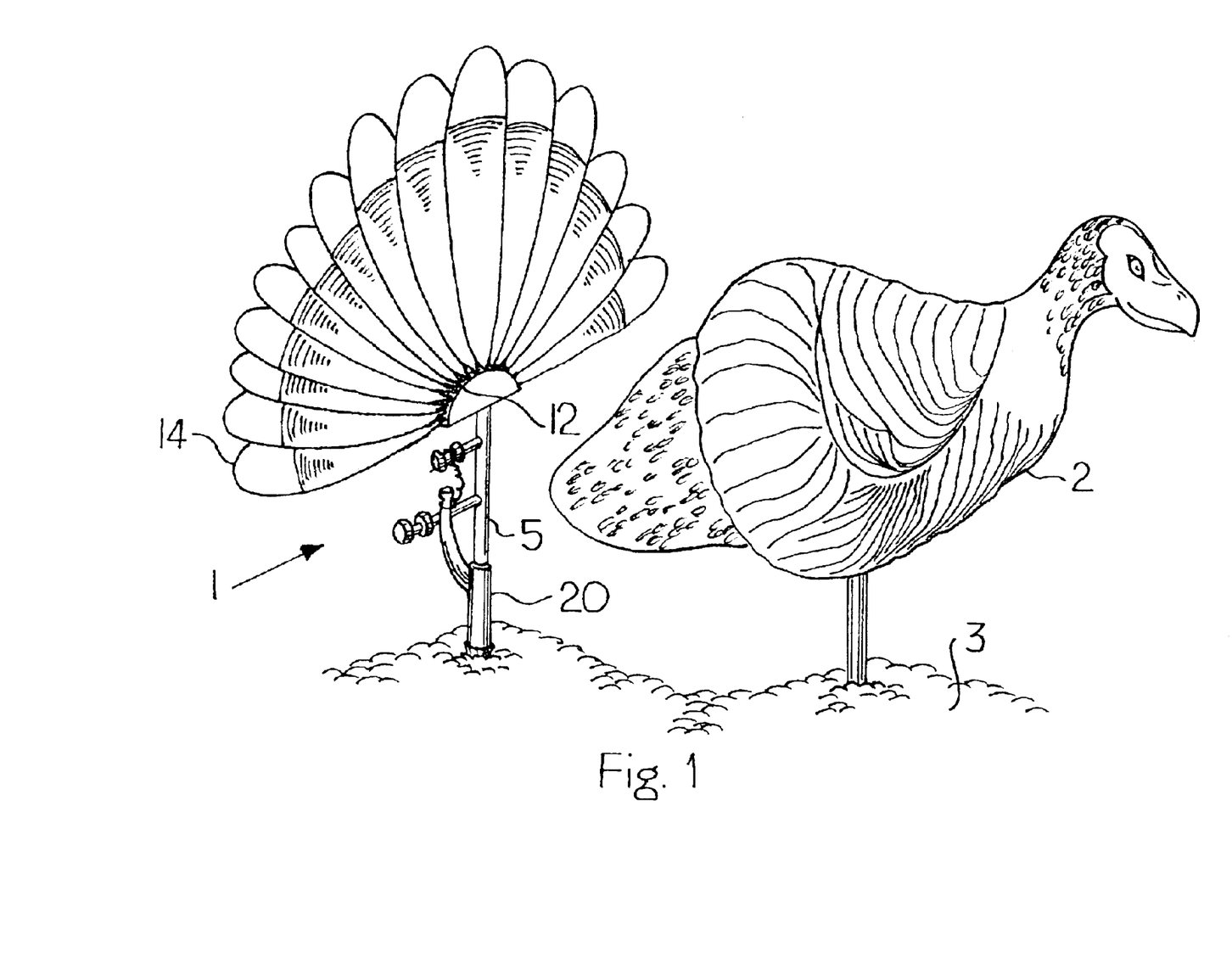
FIG. 1 is a side perspective view of a movable tail decoy apparatus used in conjunction with a turkey decoy body, in accordance with the present invention.

Referring now to the drawings in detail, FIG. 1 shows a manually activated decoy apparatus. Any animal decoy body, such as that of a turkey, deer, elk, squirrel, etc. may be placed adjacent the decoy apparatus 1. In the preferred embodiment, a turkey decoy body 2 is placed adjacent the decoy apparatus 1. The decoy apparatus 1 and turkey decoy body 2 are both inserted into the ground 3, with the decoy apparatus 1 perpendicularly and centrally abutting the rear portion of the turkey decoy body 2.

Figure 2:
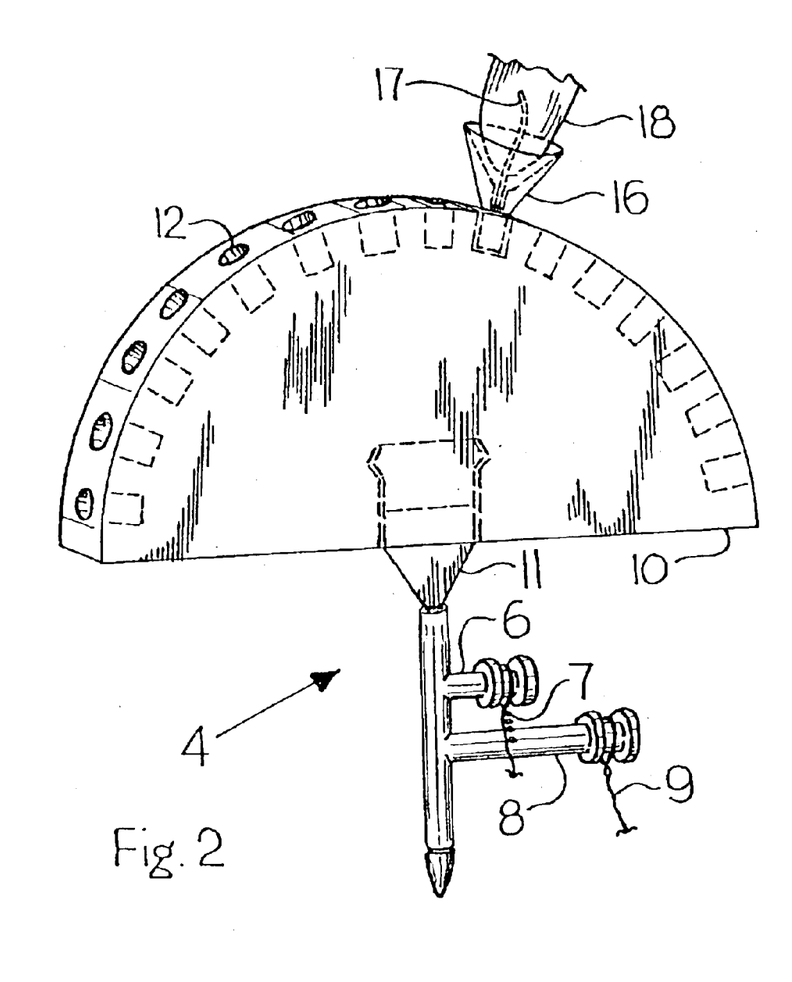
FIG. 2 is a front perspective view of a tail shaft assembly with a universal tail adapter plug, in accordance with the present invention.
Figure 3:
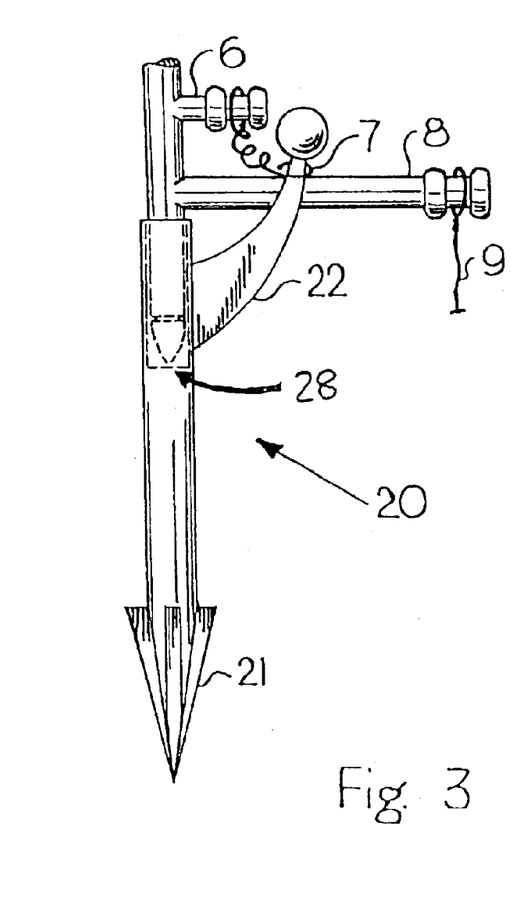
FIG. 3 is a front view of a ground shaft with a partial view of the tail shaft inserted therein, in accordance with the present invention.
Figure 4:
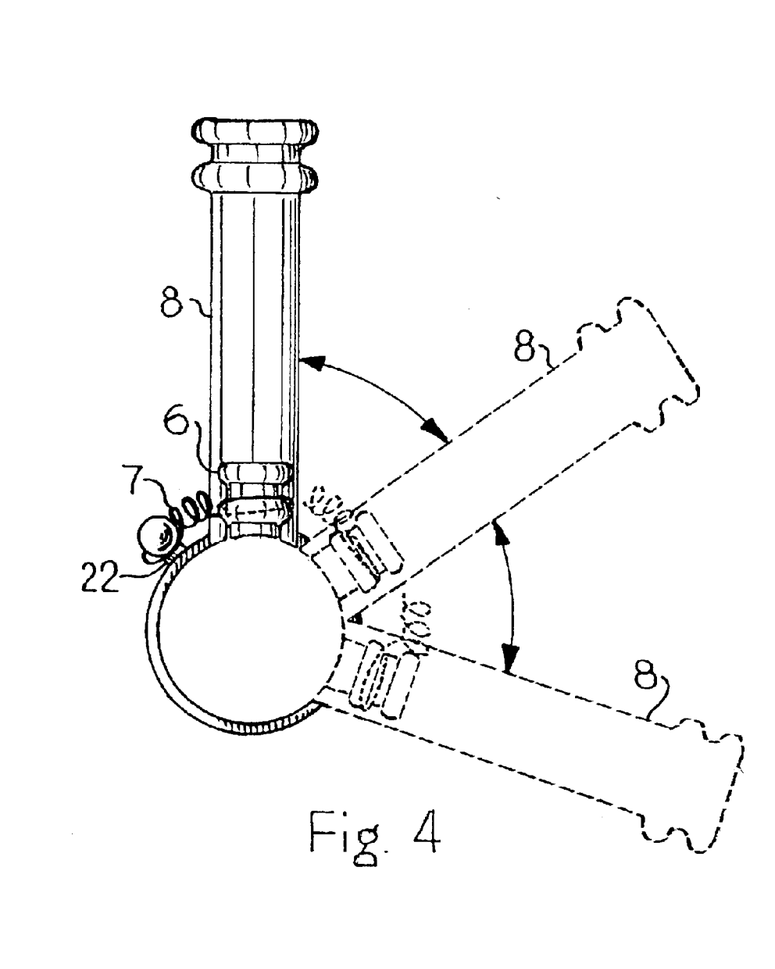
FIG. 4 is a top view of the apparatus of FIG. 1 (excluding a tail attachment member, tail-feathers, pull line, and turkey decoy body), showing its rotational movement of the pulling arm, in accordance with the present invention.

The decoy apparatus 1 is comprised of a tail shaft assembly 4 and a ground stake 20, as depicted in FIGS. 2 and 3, respectively. The component parts of the present invention may be constructed from materials including, but not limited to plastic, nylon, aluminum, steel, and wood, with the components being joined by various means, including, but not limited to tension engaging, wedging, welding, bolting, threaded engagement, dowels, heat-shrink tubing, and gluing.

The tail shaft assembly 4 is comprised of a tail shaft 5, with one end of the tail shaft 5 having a conical shape and the second end being attached to a tail attachment member 10 via a retaining clip 11, with retaining clip 11 inserted into the body of the tail attachment member 10. The tail attachment member 10 is crescent-shaped, having tail holes 12, drilled within its outer curved edge. As depicted in FIG. 1, the depth, width, and placement of each tail-feather hole 8 is sufficient to accommodate a tail-feather 14, therein. It is preferable to use real gobbler tail-feathers, as they add detail to the decoy, and thereby draw turkeys to an even closer proximity, as compared to the use of artificial feathers. The tail attachment member 10 maybe made of plywood (e.g., ¾" thickness).

The tail attachment member 10 can also be configured to accommodate other animal tails, such as that of a deer, elk, or squirrel, through use of a universal tail adapter plug 16. For example, FIG. 2 illustrates the tail shaft assembly 4 comprising a deer tail 18. The universal tail adapter plug 16 is conically-shaped, tapered, and hollowed. The deer tail 18 is positioned within the universal tail adapter plug 16 and is optionally secured within the universal tail adapter plug 16 with a wire 17. The tapered end of the universal tail adapter plug 16 is then inserted into any of the tail holes 12 of the tail attachment member 10. Furthermore, in squirrel or predator hunting, it is effective to present the movement of more than one squirrel in conjunction with an appropriate calling. To this end, the tail attachment member 10 may accommodate more than one squirrel tail by utilizing a plurality of universal tail adapter plugs 16, each occupying a different tail hole 12.

Returning to the tail shaft 5 depicted in FIG. 2, a first spring arm 6 is affixed to the tail shaft 5 in a relatively central location in relation to the length of the tail shaft 5. The first spring arm 6 is sufficient in length and diameter to removably accommodate a coil spring 7 thereon. Below and parallel to the first spring arm 6, a pulling arm 8 is affixed to the tail shaft 5. The free ends of both the first spring arm 6 and the pulling arm 8 comprise a dumbbell configuration, with integrally molded balls spaced about ¼" apart and about ¼" in diameter. This makes the molding process cheaper and easier. Washers may also be used to secure the coil spring 7 and the line 9 to the arms, instead of the dumbbells.

With continuing reference to FIG. 1, FIG. 3 depicts an assembled decoy apparatus 1, comprised of the tail shaft 5 and a ground shaft 20. The ground shaft 20 is comprised of a tapered fin 21 and a second spring arm 22. Instead of a tapered fin 21, a ½" inch diameter steel disc may be welded to the lower end of the ground shaft 20. The tapered fin 21 prevents the ground shaft 20 from moving after having been inserted into the ground 3. The second spring arm 22 extends upwardly, terminating in a ball configuration. Additionally, the top of the ground shaft 20 includes a depth-stop means 28 within or external to the ground shaft 20, sufficient in depth and diameter to rotatably accommodate the conical-shaped end of the tail shaft 5 therein. This results in the tail shaft assembly 4 resting coaxially within the ground shaft 20. The depth-stop means may comprise any number of means, including but not limited to, drilling a co-axial hole in the top of a solid ground shaft 20, or inserting a tapered dowel or other tapered cylindrical object within a hollow ground shaft, onto which the conical-shaped end of the tail shaft 5 may pivot. The ground shaft 20 may be of varying lengths or may be comprised of a shaft extension, allowing the user to adapt the ground shaft to decoys of different heights. For example, utilizing the deer tail 18 and its respective deer decoy body requires the deer tail 18 to be situated at a greater height than provided by the existing ground shaft 20. Through use of a greater length ground shaft or shaft extension, the deer tail 18 can be vertically aligned with the deer decoy body. Further assembly of the decoy apparatus 1 requires the coil spring 7 that is removably attached to the first spring arm 6 of the tail shaft 5 to be looped onto the second spring arm 22, extending from the ground shaft 20. Additionally, a pull line 9, preferably a 20 lb. test fishing line, is attached to the dumbbell configuration of the pulling arm 8, by one of various means including, but not limited to looping, hooking, and tying.

With continuing reference to FIGS. 1, 2, and 3, FIGS. 4, 5, and 6 illustrate the operation and environment of the preferred embodiment of the decoy apparatus 1. After the user has properly positioned the decoy apparatus 1 and the decoy body 2 into the ground 3, as previously discussed and as depicted in FIG. 1, the user unravels the pull line 9 to a length that would allow him to maintain a hunting position that provides visibility of the decoy area and concealment from any potential prey. Upon assuming such a position, the user may pull on the pull line 9 to activate the decoy apparatus 1. The pulling action causes the tail shaft assembly 4 to rotate upon its pivot point within the ground shaft 20. Upon the commencement of this rotation, the coil spring 7 connecting the first spring arm 6 to the second spring arm 22 begins to elongate. The continuous tension created when the coil spring 7 elongates, accompanied by controlled pulls and releases on the pull line 9 by the user, provides for natural-in-effect, side-to-side movement of the tail feathers. The decoy apparatus 1 may therefore be manually manipulated (when using turkey feathers) in such a manner as to simulate a full strut, inherent to a gobbler's mating ritual. Turkeys observing such a tail movement will successfully and consistently be attracted to the immediate area in which the decoy apparatus 1 is situated. Employing the same side-to-side movement of the decoy apparatus 1 using other animal tails in conjunction with their respective decoy bodies, will yield similar results in live animals of that kind.

Due to the diverse topography of hunting grounds, a straight, clean line to the decoy apparatus 1 may not always be achieved, thereby requiring the pull line 9 to be guided around stationary environmental objects. This may result in the normal movement of the pull line 9 to be inhibited. For example, depending upon a user's position, a different angle may be required of the pull line 9 that may only be provided by the use of guide shafts, such as long guide shaft 24 and short guide shaft 25. Furthermore, if the pull line 9 abuts an object such as a tree, entanglement of the pull line 9 may occur, resulting in unnatural motion being translated to the tail-feathers 14. Consequently, such entanglement creates friction and abrasion, thereby weakening the strength of the pull line 9 and ultimately resulting in its tearing. Uneven terrain surfaces and elevations such as a hill may present similar problems. The aforementioned situations may create failure in the operation of the decoy apparatus 1 at critical times. In reference to FIG. 5, to counter such effects, the user may utilize a long guide shaft 24 to create angled approaches over and around obstacles. The short guide shaft 25 may be utilized around the immediate area of the decoy apparatus 1, keeping the pull line 9 low to the ground 3, thereby preventing approaching turkeys from tripping on the pull line 9.

Figure 5:
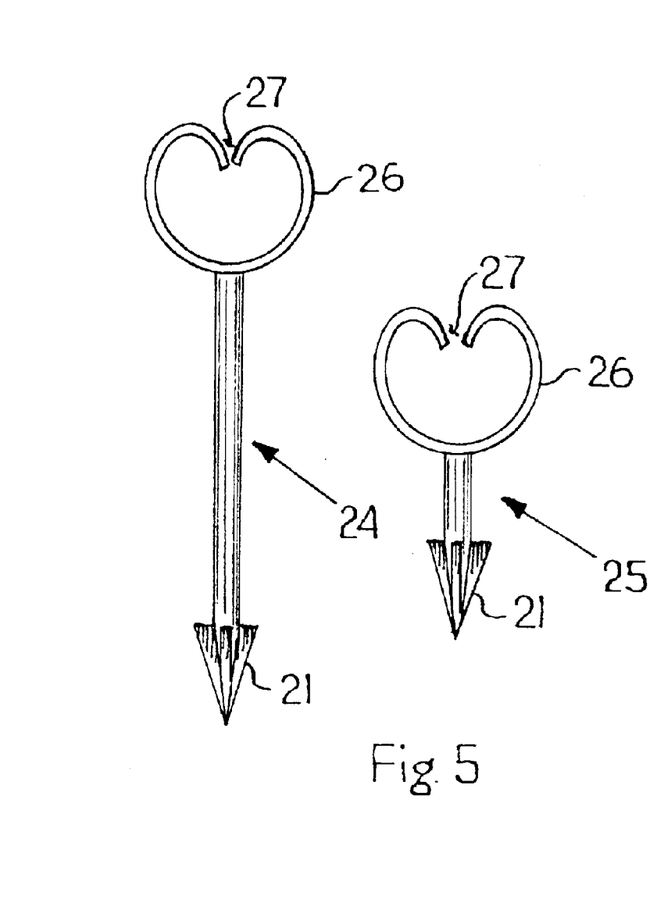
FIG. 5 is a front view of an optional guide stake, in accordance with the present invention.

Referring to FIG. 5, the long guide shaft 24 may be fabricated of the same material as used in the tail/ground shaft, or any other suitable material may be utilized in its construction. The long guide shaft 24 is comprised of a tapered fin 21 (or flat disc) affixed to the bottom of the long guide shaft 24 and a heart-shaped washer 26 vertically affixed to the top of the long guide shaft 24. The tapered fin 21 prevents the long guide shaft 24 from moving after having been inserted into the ground 3. Preferably, the heart-shaped washer 26 has a split 27 in the top portion of one of its sides, to insert the pull line 9. Almost any type of washer may be utilized, but it is preferred that the washer is of such design as to prevent the pull-line 9 from disengaging, as does the heart-shaped washer 26. The short guide shaft 25 is similar in construction to the long guide shaft 24, except for the differences in length.

Figure 6:
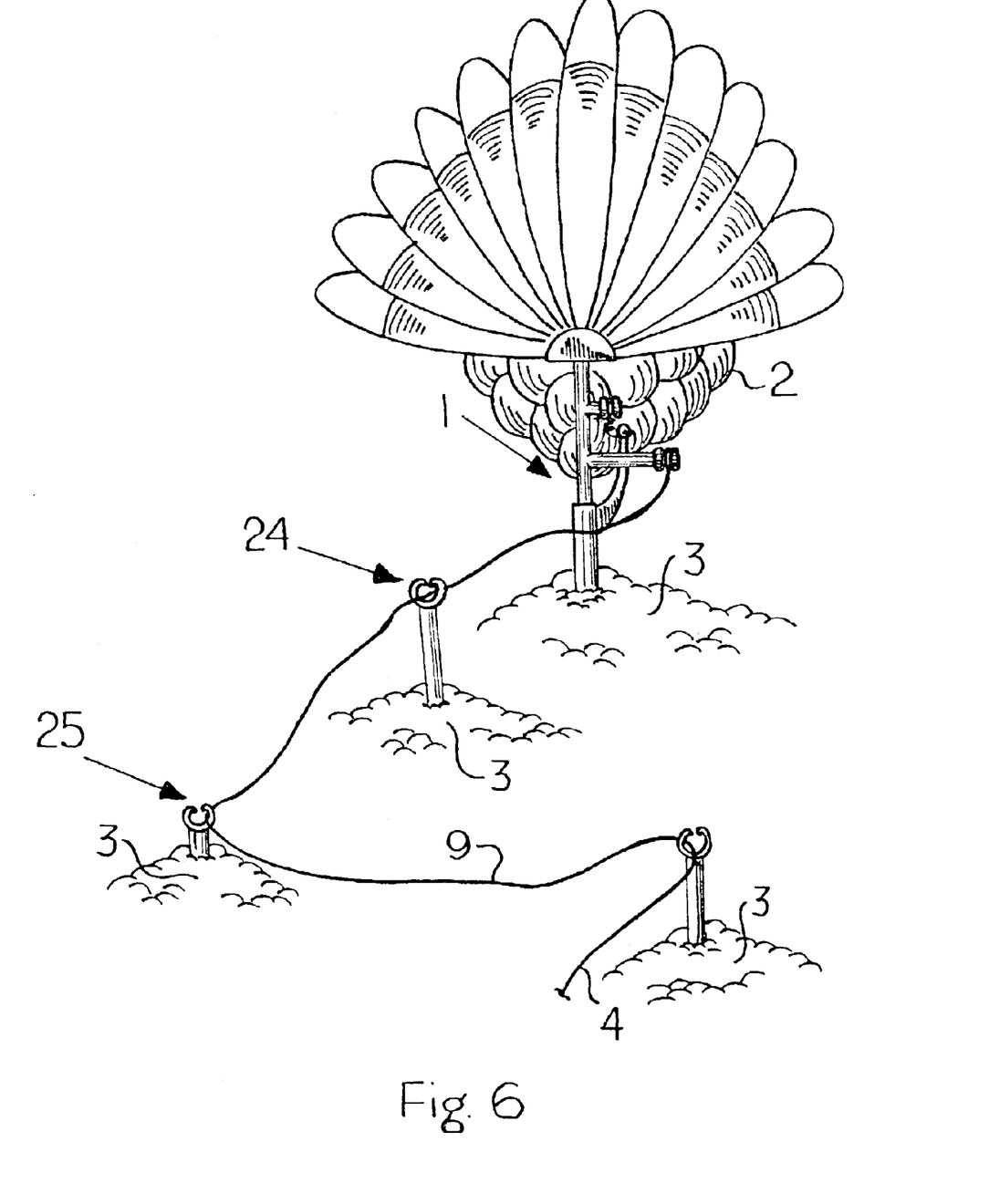
FIG. 6 is a rear elevation view of an assembled tail shaft and ground shaft, including guide shafts, used in conjunction with a turkey decoy body, in accordance with the present invention.
Figure 7:
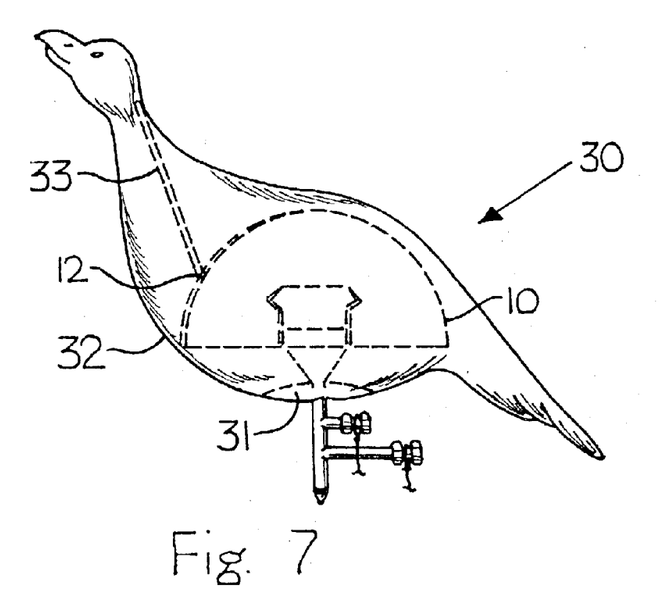
FIG. 7 is a side perspective view of the tail shaft assembly, adapted to move an entire decoy, in accordance with an alternative embodiment of the present invention.

FIG. 6 shows how both the long guide shaft 24 and the short guide shaft 25 may be optionally implemented in the use of the decoy apparatus 1, by inserting the aforementioned shafts into the ground 3 and routing the pull line 9 through the heart-shaped washer 26 of each guide shaft. In order to maintain the fullest range of movement of the tail-feathers 14, it is preferred that the guide shaft closest to the decoy apparatus 1 be situated at a 45° angle in relation to the rear of the decoy apparatus 1. The user may operate the decoy apparatus 1 regardless of whether he uses the long guide shaft 24, short guide shaft 25, a combination of both types of shafts, or no guide shafts at all.

With continuing reference to FIGS. 1–6, FIG. 7 depicts an additional feature of the decoy apparatus 1. In an alternative embodiment, the decoy apparatus 1 may be easily adapted to accept and to move the entire decoy body 2. This is accomplished by constructing a decoy assembly 30 comprising the decoy body 2, preferably a collapsible decoy with a bottom slot 31. A sufficient number of support rods 33, preferably dowels, are fitted into the tail holes 12 of the tail attachment member 10, to provide support and stability for the decoy body 2. This construction allows the user to utilize both a tail shaft assembly 4 comprising tail-feathers 14 and also a decoy assembly 30 while hunting. The manner of operation for moving the decoy body 2 is identical to the manner of operation for moving the tail-feathers 14, as discussed above, with the exception, that instead of the tail-feathers 14 being manually and controllably moved, the entire decoy body 2 achieves such an effect. Whole-body animal decoys that may be utilized for this purpose include, but are not limited to turkey, hen, squirrel, deer, and elk decoys. Additionally, as a substitution for a whole-body animal decoy, silhouette decoys, such as a jake decoy comprised of ¾" high grade foam, may be adapted to fit onto the tail shaft 5.

With continuing reference to FIGS. 1–7, FIG. 8 depicts the tail attachment member with a first carry plug 39. The first carry plug 39 is inserted into the body of the tail attachment member 10. The free end of the first carry plug 39 can accommodate a carry cord 38, which allows the user to easily carry the tail attachment member 10. The carry cord 38 preferably comprises a 3/16" black nylon lanyard.

Figure 8:
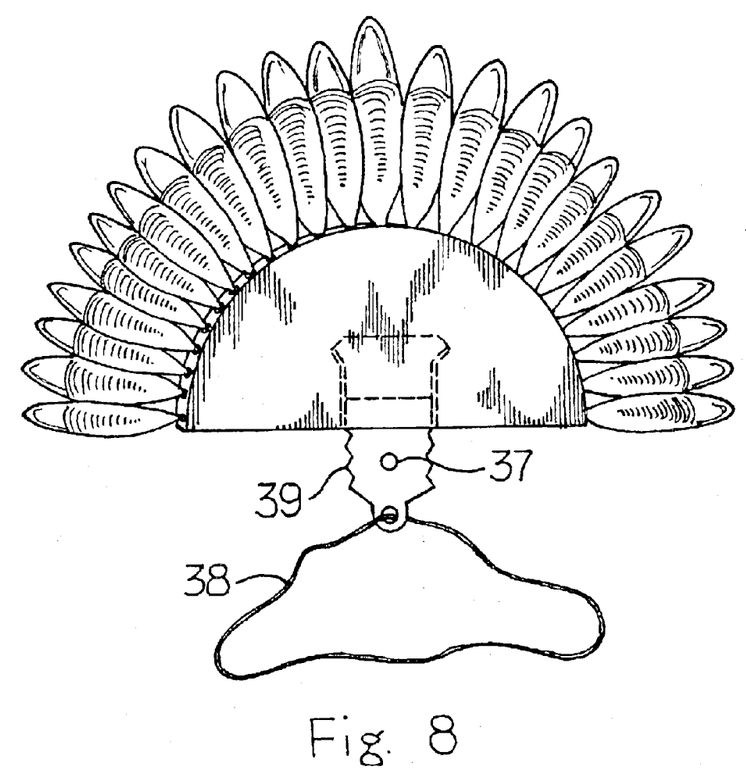
FIG. 8 is a front view of the tail attachment member with a first carry plug, in accordance with the present invention.
Figure 9:
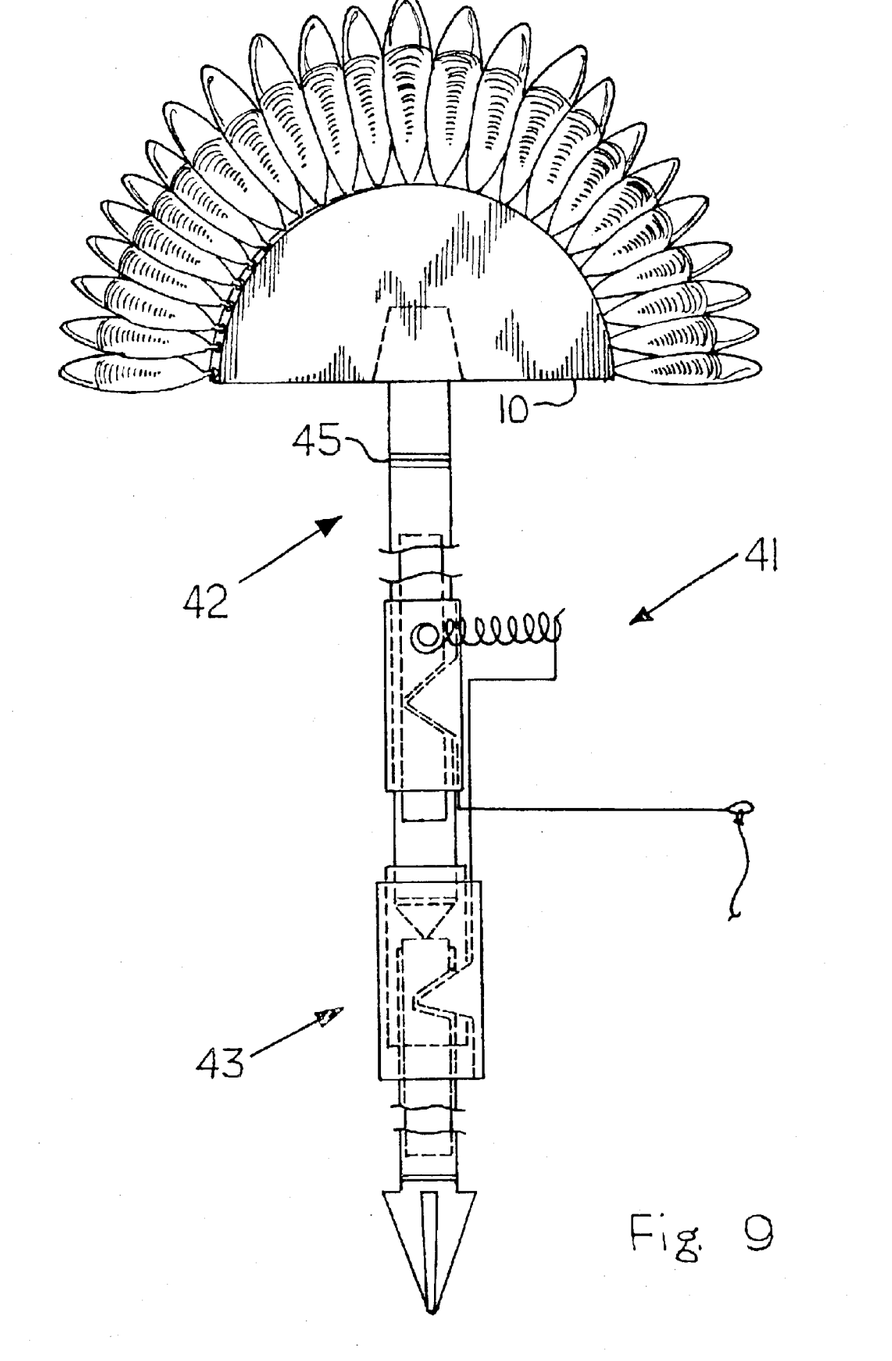
FIG. 9 is an elevation view of an arrow decoy apparatus, as disclosed in U.S. patent application Ser. No. 09/915,078 and hereby incorporated herein by reference.

Additionally, the first carry plug 39 includes a safety ribbon hole 37 for securing a safety ribbon therein, so as to communicate to other hunters that the tail attachment member 10 is associated with the user and not the decoy apparatus 1.

Figure 10:
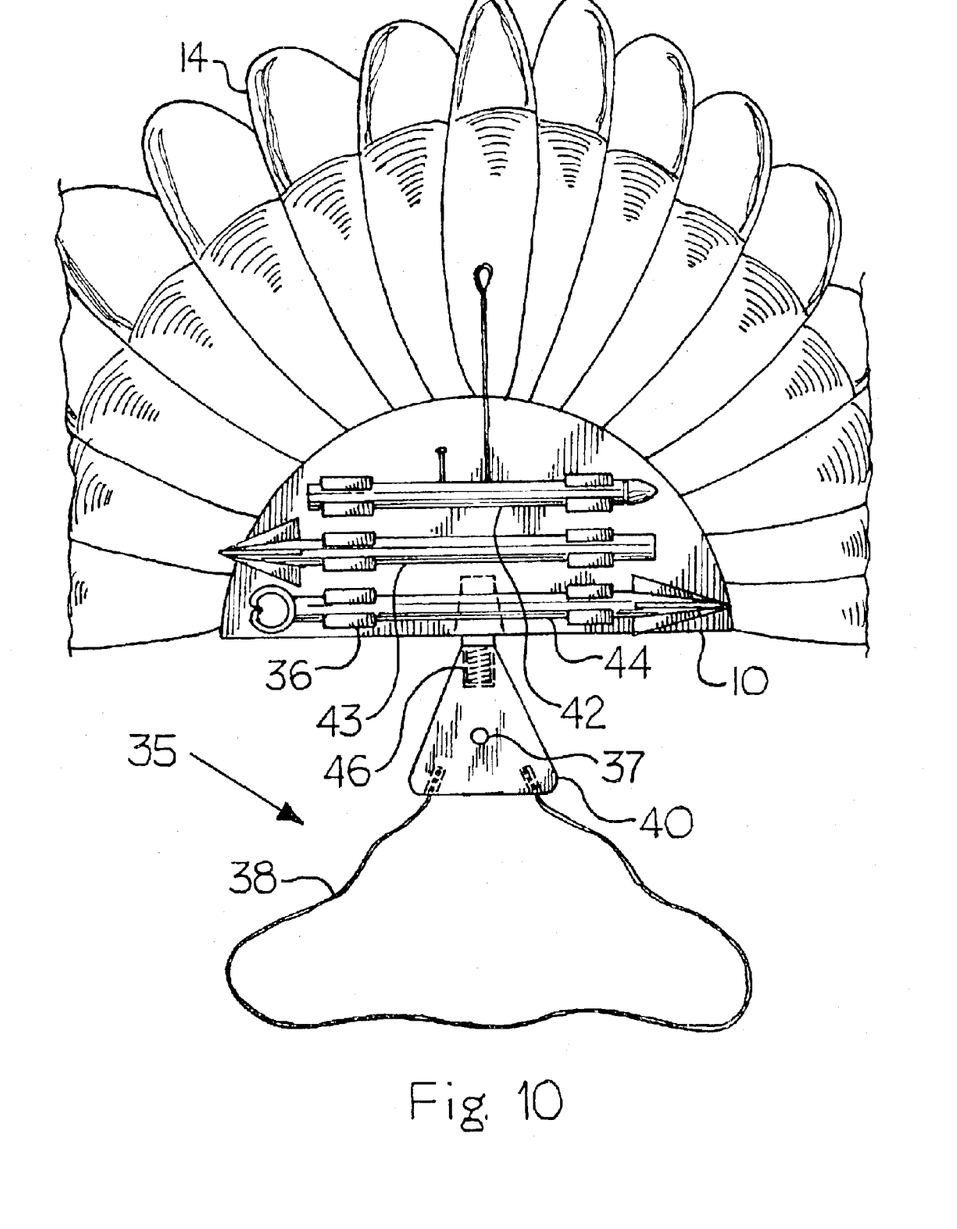
FIG. 10 is a front view of the arrow decoy apparatus of FIG. 9 with a second carry plug, in a carry-mode configuration, in accordance with the present invention.

With continuing reference to FIGS. 1–7, FIG. 9 depicts an arrow decoy apparatus 41, similar in form and function to the decoy apparatus 1, but comprising a modified construction design and lighter components, as disclosed in U.S. patent application Ser. No. 09/915,078, incorporated herein by reference. The arrow decoy apparatus 41 is comprised of an arrow tail shaft 42, an arrow ground shaft 43, and a long arrow guide shaft 44. The arrow tail shaft 42 can be attached to the tail attachment member 10 through various means, including, but not limited to, using a first threaded bushing connection 45. FIG. 10 depicts a portability mode 35 of the arrow decoy apparatus 41, wherein the removable components of the arrow decoy apparatus 41 may be attached to the tail attachment member 10, allowing the tail attachment member 10 to be transported as a unit to a hunting location by the user, where the user would reassemble the components into the operable arrow decoy apparatus 41. More specifically, in the preferred embodiment, the arrow tail shaft 42, the arrow ground shaft 43, and the long arrow guide shaft 44, are removably attached to a plurality of brackets 36 affixed to a planar surface of the tail attachment member 10. The brackets 36 may utilize varied means of retaining the removable components, including, but not limited to a tensioning or clip system. By extending in a horizontal relation to the tail attachment member 10, the removable components become unobtrusive to the user while the arrow decoy apparatus 41 is in the portability mode 35. A second carry plug 40, preferably of a triangular or round-shaped plastic construction, is attached to the body of the tail attachment member 10. The free end of the second carry plug 40 can removably accommodate the carry cord 38, to allow the user to carry the arrow decoy apparatus 41 around his or her neck. Additionally, the second carry plug 40 includes a safety ribbon hole 37 for securing a safety ribbon therein.

From the foregoing detailed description of the illustrative embodiment of the invention set forth herein, it will be apparent that there has been provided a new, useful, and uncomplicated decoy apparatus, which through controllable manual motion, produces a natural-in-effect, isolated tail-feather or tail movement. The invention requires only a minimal number of elements, utilizes real feathers or tails, is quiet, requires no electrical power source, requires only a minimal number of steps to utilize, allows uninhibited control through unlimited guide shaft configurations, may be used in a wide range of weather conditions, allows for adaptation for moving an entire decoy, and provides a portability aspect.

The above invention has been described with reference to preferred and alternative embodiments. Obvious modifications, combinations, and alterations will occur to others upon reading the preceding detailed description. It is intended that the invention be construed as including all such modifications and alterations insofar as they come within the scope of the appended claims or the equivalents thereof.

I claim:

1. A manually movable decoy device adapted for luring animals, the device comprising:

a decoy, wherein the decoy is selected from the group consisting of a tail-feather and an animal tail;

a tail attachment member, which receives the decoy;

a tail shaft having an upper end and a lower end, wherein the upper end is connected to the tail attachment member;

a pulling arm affixed to the tail shaft, the pulling arm adapted to receive a pull line;

a ground shaft having a first end and a second end, the first end adapted for insertion into the ground and the second end adapted to coaxially rotatably support the lower end of the tail shaft slidingly therein, wherein the manually movable decoy device provides controlled coaxial movement to the tail shaft in relation to the ground shaft;

a spring extending between the tail shaft and the ground shaft;

a first spring arm perpendicularly attached to the tail shaft, a first end of the spring being connected to the first spring arm;

a second spring arm upwardly extending from the ground shaft and able to receive a second end of the spring from the first spring arm;

a guide shaft having a first end adapted for insertion into the ground and a second end adapted to receive and retain the pull line;

a plurality of brackets affixed to the tail attachment member, the plurality of brackets adapted to retain the tail shaft, the ground shaft, and the guide shaft for storage and transport; and a carry cord removably connected to the tail attachment member.

2. The device of claim 1, wherein when the tail-feather is selected, the tail attachment member further comprises at least one hole able to receive the tail-feather.

3. The device of claim 1, wherein when the animal tail is selected, the device further comprises a universal tail adapter plug, wherein the universal tail adapter plug is able to receive the animal tail and is further adapted for insertion into the tail attachment member.

4. The device of claim 1, wherein the upper end of the tail shaft is perpendicularly connected to the tail attachment member, and the lower end of the tail shaft includes a pivot point.

5. The device of claim 4, further comprising a pulling arm having a near end and a distal end, the near end being affixed to the tail shaft, and the distal end having a means for attaching the pull line.

6. The device of claim 1, wherein the spring is a coil spring which connects the first spring arm to the second spring arm.

* * * * *